Nov. 30, 1965    A. KEZER ETAL    3,221,229
MODEL-REFERENCE-ADAPTIVE CONTROL SYSTEM
Filed Jan. 22, 1962    4 Sheets-Sheet 1

$\lambda$ = LAPLACE OPERATOR

ALLEN KEZER
PAUL V. OSBURN    INVENTORS.
H. PHILIP WHITAKER

BY  *Jack Larsen*

ATTORNEY

ALLEN KEZER
PAUL V. OSBURN
H. PHILIP WHITAKER   INVENTORS.

BY

ATTORNEY

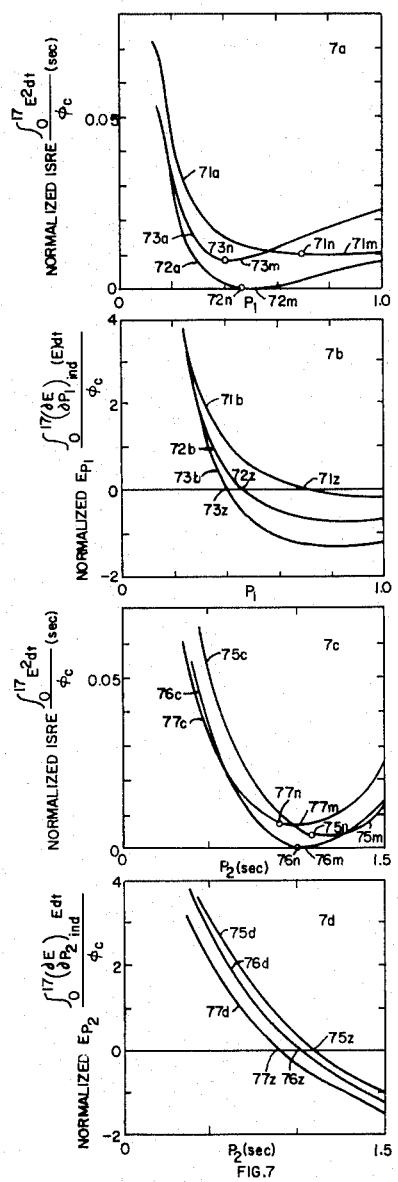
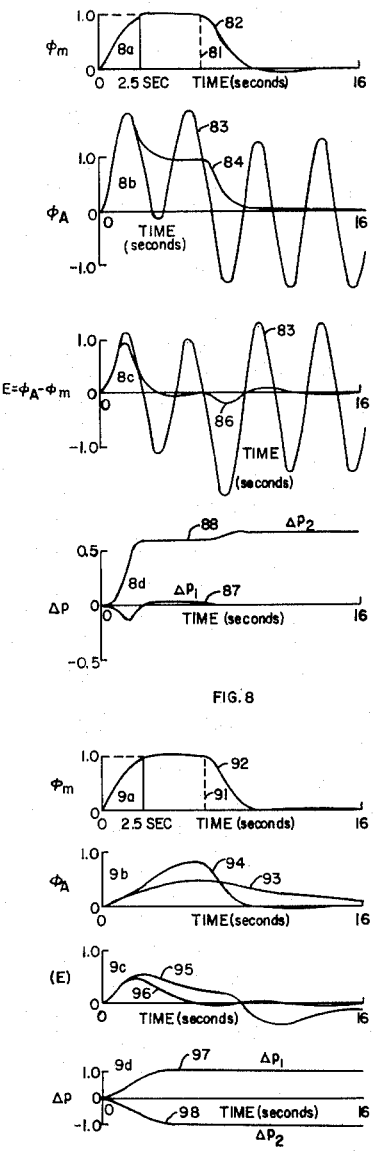
FIG.7
FIG.8
FIG.9
ALLEN KEZER
PAUL V. OSBURN
H. PHILIP WHITAKER     INVENTORS
BY
ATTORNEY

ALLEN KEZER
PAUL V. OSBURN
H. PHILIP WHITAKER

INVENTORS

BY *Jack Larsen*

ATTORNEY

United States Patent Office 3,221,229
Patented Nov. 30, 1965

3,221,229
MODEL REFERENCE ADAPTIVE CONTROL SYSTEM
Allen Kezer, North Billerica, and Henry Philip Whitaker, Framingham, Mass., and Paul Vernon Osburn, Oxon Hill, Md., assignors to Massachusetts Institute of Technology, Cambridge, Mass., a corporation of Massachusetts
Filed Jan. 22, 1962, Ser. No. 168,584
7 Claims. (Cl. 318—18)

This invention relates to automatic control systems. It relates to control systems that are self-adaptive, that is, the performance of the control system automatically is improved during its operation. More particularly it relates to an improvement of the Adaptive Control System described in a co-pending application by P. V. Osburn, Serial No. 168,583. The class of control systems to which this invention pertains is particularly appropriate to the control of aircraft and missiles.

The October 1960 issue of "Electro-Technology" magazine contains a survey article on adaptive control systems by R. A. Mathias and R. I. Van Nice. In the article, the term "adaptive control system" is given a wide interpretation. This invention relates in a more restricted sense to adaptive control systems characterized by automatic adjustments to certain parameters in the control loop or loops to compensate for changes in plant or signal characteristics or in both plant *and* signal characteristics. At page 119 of this article, Mathias and Van Nice disclose a model reference adaptive flight control system developed and tested by H. P. Whitaker of the Massachusetts Institute of Technology. The present invention relates to improvements in adaptive control systems of this so-called "MIT" type.

These systems comprise a network of elements each having an input and an output and a number of summing points whereby branches and loops are connected to link a system input to a system output. Each element has a performance function relating its input quantity to its output quantity.

The Whitaker system makes it possible to design a control system which adjusts its own controllable parameters, so that its dynamic performance satisfies the system specifications in the presence of changing operating characteristics. The novel feature is a reference model which stores the system's specifications and permits closed-loop control of the parameters through the use of response-error functions measured during the normal operating responses of the system.

Optimum or fully adapted performances are achieved when the measured error functions have values corresponding to a specified performance index. Use of the model permits design flexibility, since the model can be made to change with the operating modes of the vehicle and can exhibit non-linear characteristics if the systems specifications required these features. If the specifications are relatively loose the system model can be crude and simple, but, on the other hand, greater control of performance, and hence greater flexibility, can be achieved by designing a model of increased sophistication. The self-improving process in these prior-art systems has employed test pulses, sampling of the error quantities, cross-correlation techniques, and in some cases a process of searching for a minimum point of an error function. With these prior-art techniques it has been possible to achieve adaptation within two or three time constants of the dominant response modes of the system.

It is an object of the instant invention to make a significant reduction in the convergence time and to eliminate much of the complexity of the previous mechanisms. Features of the invention are that adaptation is continuous, using the normal inputs of the system without any special test inputs; and the adaptive features are mechanized with simple equipment.

Another feature of the invention is the extension of the model reference principle. In addition to the model system, which is ordinarily in the form of an electrical network, this invention features in the adaptation circuit additional networks each of which has the characteristics of a filter which is the reciprocal of certain of the forward path elements, one such filter being required for each of the adaptable parameters of the control system. Other features and advantages of the invention will be apprehended from the following specifications and annexed drawings of which:

Figure 6:
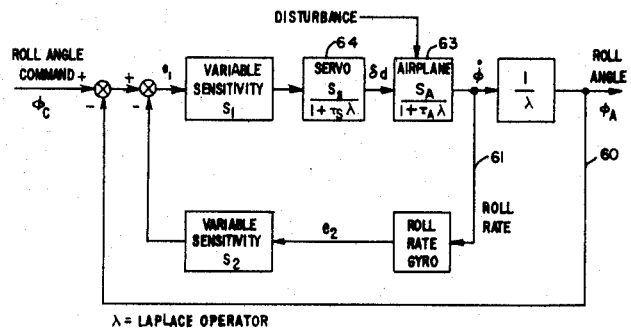
FIG. 6 is a mathematical block diagram of an aircraft roll control system to which the invention is applied by way of specific example.
Figure 10:
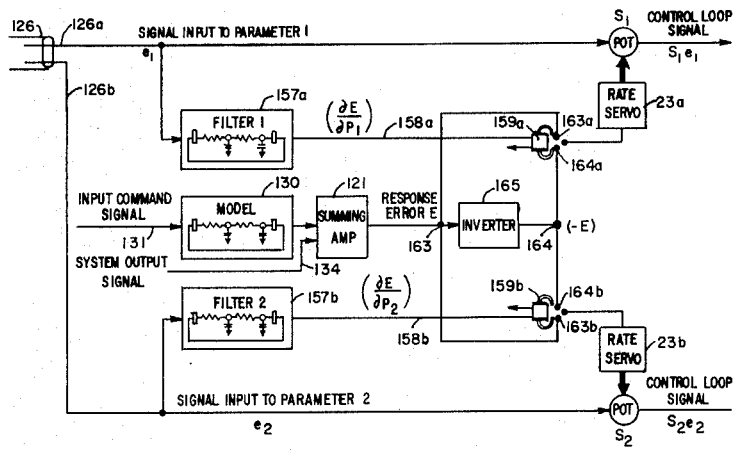
Figure 11:
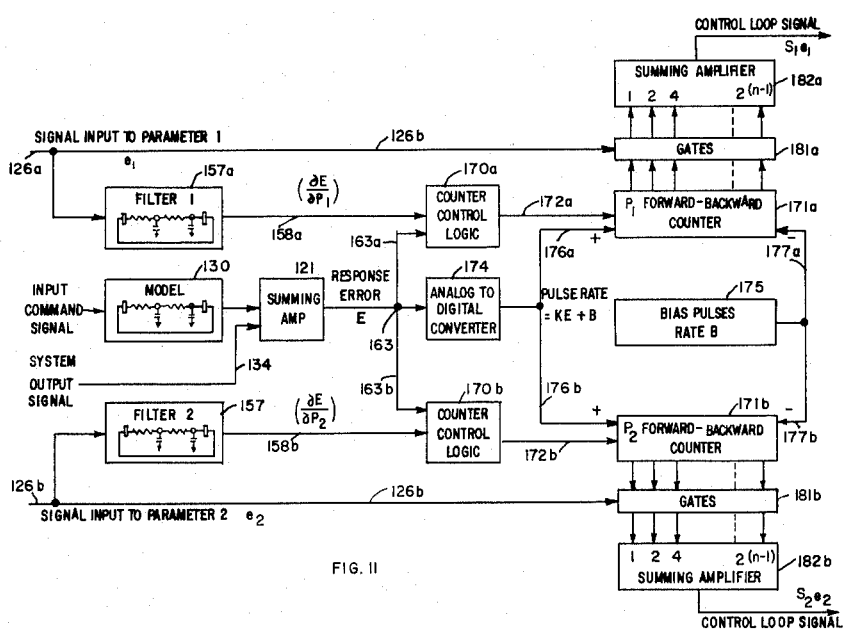

FIGS. 7a, 7b, 7c, and 7d are graphs of error functions for the adaptive roll system of FIG. 6;

FIGS. 8a, 8b, 8c, and 8d are graphs of the system response of the adaptive system of FIG. 6 for supersonic flight conditions;

FIGS. 9a, 9b, 9c, and 9d are graphs of the system response for subsonic flight conditions;

FIG. 10 is a block diagram illustrating an alternative embodiment of the invention;

FIG. 11 is a block diagram illustrating another alternative embodiment of the invention.

Figure 1:
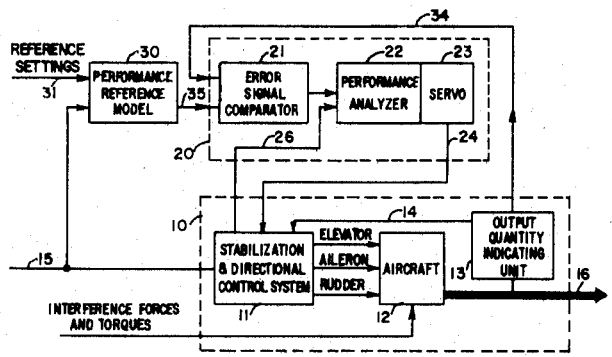
FIG. 1 is a block diagram of the model reference adaptive control system.

FIG. 1 is a simplified functional diagram of an adaptive system. The dotted box 10 incloses the stabilization and directional control system 11, the aircraft 12 upon which the system 11 operates, an output quantity indicating unit 13, and a feedback path 14. The stabilization and directional control system 11 comprises various gyroscopes, amplifiers, and actuators which are necessary to convert the pilot's directional commands 15 to motions of the aircraft control surfaces. Equipment, perhaps involving gyroscopes, is included in the output quantity indicating unit 13, whereby the attitude 16 of the aircraft 12 is converted into suitable electrical signals for feedback 14 to the control system 11. A dotted box 20 encloses the elements of the adaptation unit 20 which comprise an error signal comparator 21, a performance analyzer 22, and an adjusting servo 23, the output 24 of which adjusts the variable parameters of the stabilization and directional control system 11. The performance analyzer 22 receives as inputs the Response Error Quantity from the comparator 21, and certain intermediate signals 26 from the control system 11, as hereinafter explained. Associated with the adaptation unit 20 is the performance reference model 30 designed to respond to the directional control commands 15 as the aircraft 12 is desired to respond. Typically the model 30 will itself be subject to reference settings 31 wherein take-off weight, changes in balance, and other such variables are accommodated. A second feedback path 34 carries the electrical indications of the aircraft attitude outputs back to the error signal comparator 21 where they may be compared to the electrical outputs 35 of the performance reference model.

In these systems there are two different kinds of error quantities. One is the true system error quantity, [ε], equal to the difference between the system output quantity, $q_s$, and the corresponding commanded input, $q_{in}$. The other error quantity is the true response error quantity, [E], which is the difference between the output $q_s$ of the aircraft or plant under control and the output $q_m$ of the reference model to the same input commands $q_{in}$. Neither of these over-all error quantities [ϵ] and [E] is available in the usual case, but approximate error quantities ϵ and E, respectively indicating the system error and the response error, are available representing the differences between the *indicated* output variables and the input command and the model responses respectively. Thus:

$$[\epsilon] = q_s - q_{in} \quad (1)$$
$$[E] = q_s - q_{in} \quad (2)$$
$$\epsilon = q_{si} - q_{in} \quad (3)$$
$$E = q_{si} - q_m \quad (4)$$

The input, output, and error quantities typically are multidimensional, vector quantities, or other states defined by a plurality of scalar quantities termed components. In the case of aircraft the desired output might be described by the aircraft's position, attitude, velocity, and time of arrival, the unique determination of all of these quantities requiring ten components. In a chemical system, the component quantities might be the concentration of reactants, temperature, and pressure. A subsystem concerned only with the attitude of an aircraft would involve the three components, pitch, roll, and yaw. Thus the expressions (1) through (4) above are shorthand notation for a plurality of scalar equations.

Symbols used in these and the following equations are defined in Table I.

TABLE I.—GLOSSARY $C_{l_{\delta_a}}$—aircraft rolling moment coefficient due to aileron derivative $\frac{b}{2U_0}C_{l_p}$—effective aircraft damping rolling moment coefficient derivative $\left(\frac{I_x}{qSb}\right)$—effective aircraft rolling inertia coefficient C—arbitrary constant
[E]—a true response error defined as difference between the model and the system output quantities
E—response error defined as difference between model and indicated system output quantities
[ϵ]—true system error
ϵ—system error
e—control path voltage signal
$E_P$—error quantity for the parameter P; a function of the error which indicates the need for adjustment of P
P—the value of a controllable system parameter
ΔP—incremental adjustment to P
$(PF)_{n[q_{in}, q_{out}]}$—performance function of element n relating the output, $q_{out}$, to the input $q_{in}$
$q_{in}$—system input quantity
$q_m$—model output quantity
$q_s$—system output quantity
$q_{si}$—indicated system output quantity
(RMS)—root mean square value
$S_{n[q_{in}, q_{out}]}$—static sensitivity of element, n, relating the output, $q_{out}$, to the input, $q_{in}$, under steady conditions
t—time
$W_E(t)$—error weighting function
$\delta_a$—aircraft aileron deflection
λ—Laplace operator
$\phi_c$—commanded roll angle
$\phi_A$—aircraft roll angle
$\tau_c$—time constant of element identified by subscript
ζ—damping ratio (fraction of critical)
$\omega_n$—natural frequency

*Subscripts*

A—aircraft
S—output of a variable sensitivity point
s—system
s—servo, when no confusion with previous item exists
i—indicated
m—model
1, 2, 3 . . . —arbitrary components
c—command Components of these quantities are indicated by numerical subscripts thus: $q_{si}$, $q_{in3}$, and $\epsilon_3$ represent the third components of system-indicated output, system input, and indicated system error respectively. In general, the third component, $\epsilon_3$, of the system error, ϵ, is not the difference between the third component of system-indicated output, $q_{si3}$, and the third component of input, $q_{in3}$, because input and output may be indicated in different coordinate systems. However, in many cases, such as attitude control of an aircraft, it is desirable to resolve both input and output quantities in the same coordinate frame, selected to minimize cross-coupling, so that output *pitch* angle is substantially controlled only by input *pitch* control position, output *roll* is responsive substantially only to input *roll* control, and output *yaw* is controllable substantially only by input *yaw* control.

Then, $$\epsilon_1 = q_{si1} - q_{in1} \quad (5)$$
$$\epsilon_2 = q_{si2} - q_{in2} \quad (6)$$
$$\epsilon_3 = q_{si3} - q_{in3} \quad (7)$$

Like the system error, ϵ, the response error quantity, E, is generally a vector quantity, the components of which are indicated by subscripts thus: $E_1$, $E_2$, etc. Thus, in a typical system, $$E_1 = q_{si1} - q_{m1} \quad (8)$$

Figure 2:
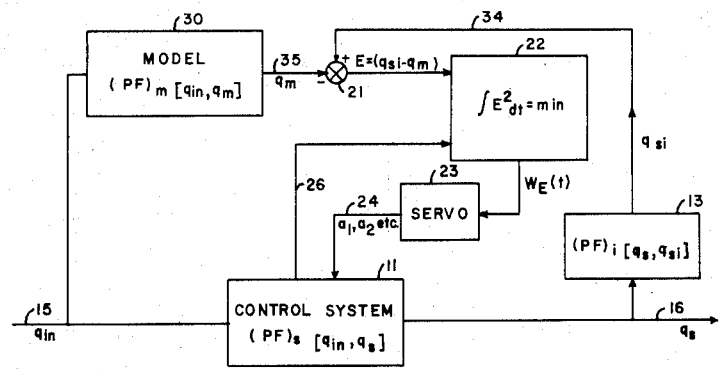
FIG. 2 is a mathematical block diagram of the system of FIG. 1.

For the purpose of a further definition of terms, FIG. 2 is a mathematical block diagram representation of the model reference adaptive control system of FIG. 1 showing the generation of the response error quantity. The performance of each component block of the diagram is represented by its performance function (or transfer function) with subscripts which identify the element and its input and output quantities. The adaptive system requires that there be a figure of merit which the adaptive system strives to optimize.

Various criteria are possible, the virtues of which depend in part upon the use to which a system may be put. The index of performance that is preferred for the present invention is the integral-squared response error, and the criterion for successful adaptation is that the integral-squared error be the minimum value obtainable with the parameter valuation provided. A performance index is thus given by the expression:

$$\int E^2 dt = \int (q_{si} - q_m)^2 dt = \text{minimum} \quad (9)$$

The performance index is a function of the adjustable parameters of the control system. It is minimized by the adjustment of the several parameters. At the minimum, $$\frac{\partial}{\partial P}\left(\int (E)^2 dt\right) = 0 \quad (10)$$

In the fully adapted system, Equation 10 holds for each and every controllable parameter. As to the control of each parameter, it is a necessary but not sufficient condition for adaptation, since in general the minimum for one parameter depends upon the values of other parameters. Heretofore it has been the practice to adjust the several parameters sequentially in processive approximations to adaptation. It is the essence of this invention that all parameters are simultaneously adjusted to approach the optimum. Since the limits of integration in Equation 10 are independent of P and since for a real system the integral of the derivative of the function exists, the differentiation of Equation 2 can be carried out under the integral sign. This operation defines new error quantities of the form $E_P$, which is the error index for the parameter, P.

$$E_P = \int \frac{\partial (E)^2}{\partial P} dt = 2 \int \left(\frac{\partial E}{\partial P}\right) E \, dt \quad (11)$$

The performance index then requires that this error index be zero for all parameters, $P_1$, $P_2$, etc. Adaptation to optimum is the process of minimizing the error indices. Useful information for the purpose of adjusting the parameters is obtained if the *direction* or *sign* of the required adjustment is known, even though knowledge of the amount of adjustment be inaccurate.

Figure 3:
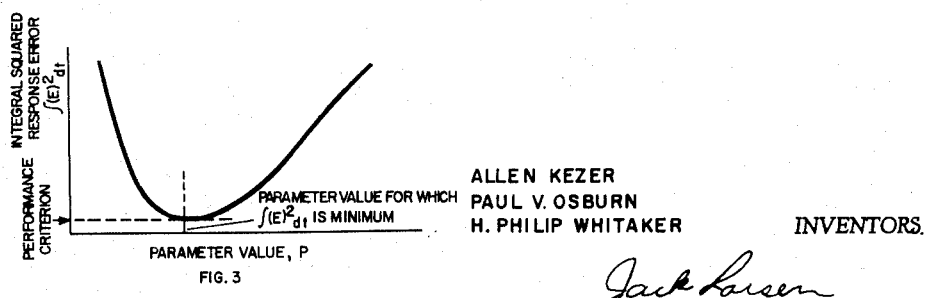
FIG. 3 is a graph showing typical variation of integral-squared criterion within the adjustable parameter.

In well-designed real systems the variation of index with parameter change exhibits but a single minimum, as illustrated in FIG. 3. In such a case, the algebraic sign of the integrand of Equation 11 indicates the direction in which the parameter should be changed. Of practical importance in the mechanization of a controller, this permits the integration to be performed in the same device which adjusts the parameter. All that is required is to generate one signal proportional to $(\partial E/\partial P)$, another signal proportional to E, take their product and apply it to the parameter adjusting device.

The error quantity, E, is readily available; not directly available are the partial derivatives represented by $(\partial E/\partial P)$. It has been discovered that practical approximations of these partial derivatives can be generated in a model-reference adaptive control system. For compactness in the development below, the partial derivatives are considered as weighting functions defined by Equation 12.

$$[W_E(t)] = \frac{\partial E}{\partial P} \quad (12)$$

Since the variations of the system do not affect the model, $$[W_E(t)] = \frac{\partial E}{\partial P} = \frac{\partial q_{si}}{\partial P} \quad (13)$$

The brackets indicate that we are here concerned with exact theoretical quantities.

Figure 4A:
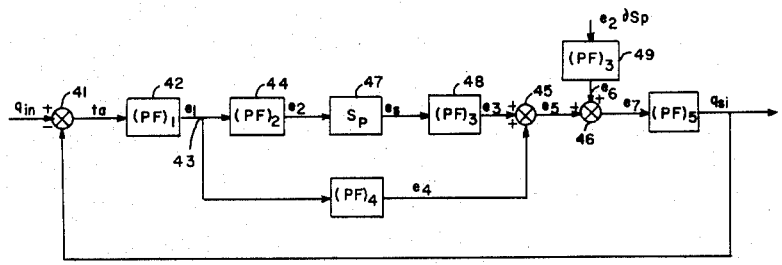
FIGS. 4a and 4b are generalized control system block diagrams represented by the single block 10 in FIG. 2.
Figure 4B:
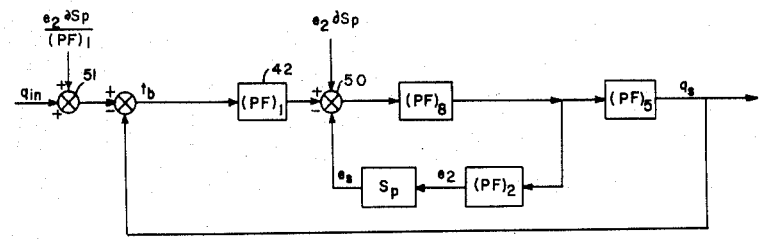

FIGURES 4a and 4b illustrate generalized control system block diagrams. Each element of the system has a performance function which is a function of frequency, specifying for any frequency the amplitude ratio of output to input and the phase angle. The performance resulting from a signal passing through a number of devices is obtained by multiplying the amplitude ratios and adding the phase angles, as is well known in the art.

In FIG. 4a the input, $q_{in}$, is applied to a summing point 41 at which the output, $q_{si}$, is subtracted from it, the difference (the negative of the system error quantity) being applied to the first system element 42 having its characteristic performance function, $(PF)_1$. The output $e_1$ of element 42 is related to the input by the equation $$e_1 = (q_{in} - q_{si})(PF)_1 = (PF)_1 \epsilon \quad (14)$$

The output of the element 44 is given by the equation $$e_2 = (q_{in} - q_{si})(PF)_1(PF)_2 \quad (15)$$

where $(PF)_2$ is the performance function of element 44. Similarly, $$e_3 = e_2 S_p (PF)_3 \quad (16)$$

and $$e_4 = e_1 (PF)_4 \quad (17)$$

Summing points 41, 45, and 46 represent differential gears, a means by which summing may be mechanized. The signs plus (+) or minus (−) indicate whether the signal is added or subtracted at the summing point. Thus:

$$e_3 + e_4 = e_5 \quad (18)$$
$$e_5 + e_6 = e_7 \quad (19)$$

The controllable parameter is represented by element 47 having a performance function in the nature of a variable sensitivity, $S_p$. Across the controllable sensitivity $$e_s = S_p e_2 \quad (20)$$

Also $$\partial e_s = e_2 \partial S_p; \quad e_s + \partial e_s = S_p e_2 + e_2 \partial S_p \quad (21)$$

The effect of the change, $\partial S_p$, can be considered as a disturbing signal, $e_2 \partial S_p$, injected into the system at an appropriate summation point either directly following $S_p$ or at a more remote point in the system. In FIG. 4a the injection is at the summing point 46 removed by the element 48 and its performance function $(PF)_3$ from $S_p$. To relate the disturbance $e_2 \partial S_p$ back to element 47, it is passed through the filter 49 having the same performance function, $(PF)_3$, as the element 48. FIG. 4b illustrates a generalized control system in which the variable parameter $S_p$ is in the feedback path. In that case the disturbing quantity is added directly at the feedback summation point 50. The same effect is obtained by adding the quantity $e_2 \partial S_p / (PF)_1$ at the input summing point 51.

As shown in the J. G. Truxal book, Control Systems Synthesis (New York: McGraw Hill, 1955), the equivalent of a change of sensitivity can be determined by relating the disturbance back to the input by dividing the disturbance signal by the performance function of the chain of elements of the forward signal path from the input $q_{in}$ to the disturbance summation point, then by relating the equivalent input disturbance to resulting output disturbance by multiplying by the overall performance function of the system. Thus, for FIG. 4a:

$$\partial q_s = \frac{(PF)_{s[q_{in}, q_s]}(PF)_3 e_2 \partial S_p}{(PF)_1[(PF)_4 + (PF)_2 S_p (PF)_3]} \quad (21a)$$

and for FIG. 4b:

$$\partial q_s = \frac{(PF)_{s[q_{in}, q_s]} \cdot e_2 \partial S_p}{(PF)_1} \quad (21b)$$

Hence, for 4a:

$$\left(\frac{\partial q_s}{\partial S_p}\right) = (PF)_{s[q_{in}, q_s]}\left(\frac{(PF)_3}{(PF)_1[(PF)_4 + S_p(PF)_2(PF)_3]}\right) e_2 \quad (22a)$$

and, for 4b:

$$\left(\frac{\partial q_s}{\partial S_p}\right) = (PF)_{s[q_{in}, q_s]}\left(\frac{1}{(PF)_1}\right) e_2 \quad (22b)$$

Equations 22a and 22b show that the exact error weighting function, $[W_E(t)]$, is a quantity that could be generated by multiplying together two performance functions, one of which is the system input-output performance function, the other being in the nature of a filter having characteristics the reciprocal of the transfer function of certain of the forward path elements, here those in the network from the input summing point to the output of the variable sensitivity element. Unfortunately this multiplication cannot be mechanized, because it is exactly one's ignorance of the system performance function that leads to the requirement for adaptation.

According to this invention, acceptably approximate weighting functions can be generated by using the performance function of the model in the place of the performance function of the system. Since the control system is designed to meet its design specifications with suitable values of the controllable parameters and since the model is merely the representation of the system specifications, the dynamic characteristics of the model must be a good approximation to the dynamic characteristics of the system when adaptation is complete. It has been discovered in aircraft control systems and the like that the degree of approximation under conditions of poor adaptation is good enough so that adjustment of parameters is in the correct direction, whereby adaptation results.

Making this substitution, the practical weighting function for the system of FIG. 4a is given by:

$$W_E(t) = (PF)_{m[q_{in}, q_m]}\left(\frac{(PF)_3}{(PF)_1[(PF)_4 + S_m(PF)_2(PF)_3]}\right)e_2 \quad (23)$$

Figure 5:
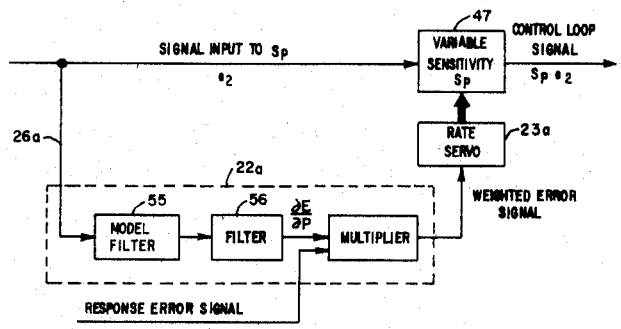
FIG. 5 is a functional diagram illustrating a feature of the invention.

FIG. 5 is a functional diagram of a system for the generation of a parameter control signal according to this invention. In practice, the controllable sensitivities are located preferably at points for which the cascaded forward loop performance functions are simple, known compensation functions.

FIG. 5 represents the system for generation of a parameter control system for the variable parameter $S_p$ in accordance with the invention. The dotted box 22a represents that portion of the performance analyzer 22 which is devoted to the adjustment of a single parameter. It contains a filter 55 which has a response to the parameter identical to that of the reference model 30; in series with filter 55 is the filter 56. The performance function of filter 56 is the reciprocal of appropriate forward path elements of the system, as explained above.

The validity of the approximation of the filter 55 to the system and of the filter 56 to the reciprocal of the subsystem depends upon the accuracy of the system by the model. In the neighborhood of optimum response, the approximation is good. For system parameter settings far removed from optimum, the approximation is poor. For the latter case, however, the error is large, and insofar as the algebraic sign of the weighting function is correct, a large adjustment indication in the correct direction is obtained. The purpose of the weighting function is thus to insure that the weighted error has the correct sign. Even though the weighted error has the incorrect sign instantaneously, satisfactory results are obtained if the integral of that quantity has the proper sign over the evaluation period. Thus one can expect some net change in the parameter in the proper direction for all component frequencies of the signal quantities for which the phase of the model output does not vary more than 90° from that the the system output. This fact can sometimes be used to advantage in the design of the model.

The mathematical steps and the block diagram manipulation implied in the derivation of the above equations are dependent strictly on a constant coefficient linear system for validity. If the parameters are varied during the response to input signals, these equations are in error by perturbation terms, the magnitude of which depends on the parameter rates of change. It is found, however, that use of the evaluation procedure derived under the restricted assumptions still yields proper adjustment even when adjustment is performed during the response. Specifically, parameter adjustment is made during response according to Equation 11. The system operation is thus nonlinear and the previous equations are accurate only in the neighborhood of the optimum response state where parameter rates of change become small as the error function slope approaches zero. The validity of the various approximations has been demonstrated by the fact that this procedure yielded correct results for initial conditions of the parameters that had resulted in an unstable system as well as for operations in the vicinity of the optimum values. Rapid recovery from an initially unstable state has also been accomplished even when the system was excited by a disturbance input only.

To illustrate the design procedure, the invention is applied to a roll axis flight control system for a supersonic transport. The basic control system is represented by the mathematical block diagram of FIG. 6 which shows feedback paths for roll angle 60 and roll angular velocity 61. The operation of the system is simulated at five flight conditions on an analog computer. The results for two representative flight conditions are presented here: supersonic cruise, Mach 3.5 at 75,000 ft.; and subsonic climb, Mach 0.9 at 10,000 ft. The aircraft response relating roll angular velocity to the aileron deflection is represented by the approximate rolling moment equation $$\left(\frac{I_x}{qSb}\right)\ddot{\phi} - \frac{b}{2U_0}C_{l_p}\dot{\phi} = C_{l_{\delta_a}}\delta_a \quad (24)$$

The solution of Equation 24 is a first order lag performance function with the static sensitivity and time constant both functions of the flight condition. That is, for the aircraft 63.

$$(PF)_{A[\delta, \dot{\phi}]} = \left(\frac{S_{A[\delta, \dot{\phi}]}}{1 + \tau_A \lambda}\right) \quad (25)$$

where $\lambda$ = Laplace operator.

Between the two flight conditions presented here, there is a 2.5 to 1.0 change in sensitivity and a 7.5 to 1.0 change in time constant. A first order aileron servo 64 is chosen so that the roll angle control system is third order. It is specified that the dynamic performance should approximate that of the same second order model for these two flight conditions. The model exhibits a natural frequency of 1.2 rad./sec. and a damping ratio of 0.7.

To maintain approximately constant dynamics of the complete flight control system, it includes variable sensitivities $S_1$ and $S_2$ adjusting the roll angle and roll angular velocity feedback loops as shown in FIG. 6. For adaptation, the two controllable parameters, $S_1$ and $S_2$, are defined as follows: $P_1$, the static sensitivity of the roll angle loop from roll angle, $\phi_A$, to aileron angle, $\delta_a$; and $P_2$, the ratio of roll angular velocity feedback signal to the roll angle feedback signal. Thus from the diagram $$\left.\begin{array}{l}P_1 = S_1 S_s \\ P_2 = S_2\end{array}\right\} \quad (26)$$

Application of Equation (11) shows that the parameter adjustment signals are obtained by mechanizing the following equations:

$$E_{P_1} = 2\int\left(\frac{\partial E}{\partial P_1}\right)E\,dt \quad (27)$$

$$\{W_E(\lambda)\}_1 = C_1(PF)_m e_1(\lambda) \quad (28)$$

$$E_{P_2} = 2\int\left(\frac{\partial E}{\partial P_2}\right)E\,dt \quad (29)$$

$$\{W_E(\lambda)\}_2 = C_2(PF)_m e_2(\lambda) \quad (30)$$

where the C's are arbitrary constants.

FIGS. 7a and 7c shows the static variation of the integral-squared error integrated over a period of 17 seconds after imposition of a step command in roll angle. FIGS. 7b and 7d show the corresponding variation in the error quantities $E_{P_1}$ and $E_{P_2}$. Curve 71a shows the variation of normalized integral square response error (ISRE) with variation in the parameter $P_1$ for $P_2$ equal to 1.50. Curve 72a shows the variation of ISRE for $P_2$ equal to 1.00, and curve 73a shows the variation of ISRE for $P_2$ equal to 0.75. Curve 71b shows the variation of the error quantity $E_{P_1}$ as a function of $P_1$ for $P_2$ equal to 1.50 seconds; curve 72b is for $P_2$ of 1.0 second; and curve 73b is for $P_2$ of 0.75 second. Curve 75d is for $P_1$ equal to 0.80; curve 76d is for $P_1$ equal to 0.45; and curve 77d is for $P_1$ equal to 0.30. Points 71m, 72m, 73m, 75m, 76m, and 77m are the points for which ISRE is minimum. Points 71z, 72z, 73z, 75z, 76z, and 77z are points for which error quantities are zero. Points 71n, 72n, 73n, 75n, 76n, and 77n indicate points on ISRE curves (FIGS. 7a and 7c) which would be selected by criterion of nulling error quantities according to FIGS. 7b and 7c respectively. The significance of these curves is to demonstrate that whether the minimum of the ISRE curve or the null of the $E_P$ curve is selected as the criterion for adaptation, there is little difference in the resulting ISRE. These curves also tend to indicate the type of operation to be expected when the adaptive loops are closed and the system parameters allowed to vary during the transient solution.

FIGS. 8a, 8b, 8c, and 8d represent system performance on the same time scale in adaptive and unadaptive operation for a supersonic transport at Mach 3.5 and 75,000 ft. altitude. FIG. 8a represents the command input, dotted curve 81, and the resulting model response, curve 82. FIG. 8b represents the roll angle, $\phi_A$, system response to the commanded input of FIG. 8a. Curve 83 represents the response of the unadapted system. Curve 84 represents the first solution with the adaptive system operating. FIG. 8c is a plot of the response error for the unadapted system, curve 85, and for the adapted system, curve 86. Curve 85 may be generated by subtracting curve 82 from curve 83. Curve 86 may be generated by subtracting curve 82 from curve 84. FIG. 8d shows the change in $P_1$, curve 87, and in $P_2$, curve 88, during the first adaptive solution. It is seen that with only one portion of error information, the system has been rapidly brought under control and has come very close to the optimum state. Adaptation is essentially complete after the first solution and for succeeding inputs the adaptive system makes only small corrections to the parameters. FIGS. 9a, 9b, 9c, and 9d shows the performance of the same aircraft system under subsonic, Mach 0.9, conditions at an altitude of 10,000 feet, wherein the initial settings of the parameters $P_1$ and $P_2$ are such that the system without adaptation is over-damped and sluggish. The results are similar to the results shown in FIGS. 8a, 8b, 8c, and 8d. Curves 91, 92, 93, 94, 95, 96, 97, and 98 represent respectively the same quantities as the curves 81, 82, 83, 84, 85, 86, 87, and 88 above defined: namely, input 91, model output 92, roll angle unadapted 93, adapted 94, response error unadapted 95, adapted 96, change in $P_1$ 97, and change in $P_2$ 98.

It is unlikely that such extreme initial conditions would be encountered in actual practice, but the two examples illustrate the capability for extremely rapid adaptation and indicate the ability of the system to keep "up to date" during rapid changes in environment.

Although it is unlikely that one would build a real airplane with the same model for all flight conditions, Table II is a summary of the aircraft characteristics and the parameter values selected by the adaptive system at five flight conditions over a typical flight profile. The system results in essentially the same integral-squared error at all conditions, and the agreement between system and model is similar to that shown in FIGS. 8 and 9.

adaptation, in particular the adaptation of the system of FIG. 6. It also represents a practical simplification of the system, whereby the algebraic sign of only the error quantity derivatives is employed as a further approximation of the derivatives, that is, in carrying out the multiplication under the intergral sign of Equation 11. That is, all positive values of $(\partial E/\partial P)$ are approximated by $(+1)$, and all negative values are approximated by $(-1)$. In FIG. 10 the system model 130 corresponds to the model 30 in FIG. 1. The input 131 to the model communicates the input, $\phi_c$, to the adaptation equipment. The output of the system, $\phi_A$, is communicated to the apparatus by the path 134 corresponding to path 34 of FIG. 1. A plurality of system response quantities $e_1$ and $e_2$ is carried from the control system by a multi-channel conduit 126 corresponding to path 26 in FIG. 1. Conduit 126 contains a path 126a for the quantity $e_1$, which is the input to the controllable element $S_1$. Path 126b carries the quantity $e_2$, which is the input to the controllable element $S_2$. For controllable parameters $S_1$ and $S_2$ there are filter units 157a and 157b respectively, to which the signals $e_1$ and $e_2$ respectively are applied. Each of these filters has a performance function, as explained in connection with FIGS. 4 and 5, which is the equivalent of the model 130 cascaded with the reciprocal of the forward characteristics of appropriate elements of the control system. For the arrangement of FIG. 6, the second factor is $1/S_1$ for the filter 157a and unity for the filter 157b. These factors are both frequency-invariant; therefore, in this case the filters 157a and 157b may be identical to the model 130. The output of the filter 157a is applied by path 158a to a polarized relay 159a, and the output of the filter 157b is applied by path 158b to a polarized relay 159b. The relays are switched in one direction for positive polarity of the leads 158a and 158b and in the opposite direction for negative polarity.

The summing amplifier 121 corresponds to the error signal comparator 21 of FIG. 1. It generates the response error $$E = q_{s1} - q_m \qquad (4)$$

by the electrical indication of output roll angle to the negative of the model response. The quantity E is available at the point 163 and on terminals 163a and 163b, respectively, of the relays 159a and 159b, respectively. The negative of the quantity E, designated $(-E)$, is available at the output 164 of the inverter 165. It is connected to the terminals 164a and 164b of relays 159a and 159b, respectively. Thus, the rate servo 23a is commanded to turn the potentiometers at a rate proportional to the response error, E, and in a direction which depends upon whether the response error, E, and the weighting function, TABLE II.—SUMMARY OF AIRCRAFT CHARACTERISTICS AND THE PARAMETER VALUES SELECTED BY THE ADAPTIVE SYSTEM

| No. | Flight Conditions | | Aircraft Characteristics | | Parameter Values Selected by Adaptive System | |
|---|---|---|---|---|---|---|
| | Operating Regime | Mach No. | Altitude (feet) | $S_A[\delta, \phi]$ (deg./sec./deg.) | $\tau_A$ (sec.) | $P_1$ | $P_2$ (sec.) |
| 1 | Supersonic cruise | 3.5 | 75,000 | 9.0 | 3.00 | 0.465 | 1.00 |
| 2 | Low speed and altitude | 0.4 | 5,000 | 2.2 | 1.00 | 0.700 | 0.575 |
| 3 | Landing | 0.18 | Sea level | 1.0 | 1.80 | 2.530 | 0.835 |
| 4 | Acceleration to cruise altitude and speed. | 2.0 | 40,000 | 10.0 | 1.00 | 0.138 | 0.465 |
| 5 | Subsonic climb | 0.9 | 10,000 | 4.0 | 0.40 | 0.195 | 0 |

Model: $\omega_n = 1.2$ rad./sec.; $\zeta = 0.70$.

This invention is in the nature of an improvement in the method of approaching adaptation in an adaptive control system of the MIT type and represents improvements in the class of model reference adaptive control systems. The design of these systems as represented by FIG. 1 is well known in the art. A general and simplified embodiment of the invention has been described in connection with FIG. 5. FIG. 10 illustrates the operation of the invention to adjust a plurality of parameters toward $(\partial E/\partial P_1)$, are of the same or opposite polarities. It is similar for the servo 24b, depending upon the polarities of E and $(\partial E/\partial P_2)$. FIG. 11 is an alternative mechanization of the system of FIG. 10 in which electronic circuitry performs the functions of the eletromechanical relays 159a and 159b and servos 23a and 23b of FIG. 10. Counter-control logic circuit 170a contains necessary diodes and trigger circuits so that the counter 171a is directed to count forward if inputs 158a and 163a are both of the same sign and to count backward if inputs 158a and 163a are of opposite sign. The output 172a of the logic circuit 170a represents the connection through which the counter direction is controlled. The analog to digital converter 174 is a circuit which converts the response error into a pulse rate proportional to the response error. Since a negative pulse rate has the same effect as a positive pulse rate, such a circuit has the effect of taking absolute value of the error E. For many practical reasons, such as the fact that multivibrator circuits tend to have a characteristic which is linear when period is related to bias, it is preferable to operate the converter 174 according to the rule:

$$\text{Rate} = KE + B \qquad (26)$$

rather than by the rule:

$$\text{Rate} = KE \qquad (27)$$

The bias pulser 175 produces pulses at the rate B. The pulses of rate $(KE+B)$ are applied to one input 176a of the counter 171a. The pulses of rate B are applied to an opposite input 177a of the counter 171a. The circuitry is arranged so that only the difference rate KE is effective in driving the counter 171a forward or backward as the logic requires. In a similar way, logic 170b, counter 171b, converter 174, and bias pulser 175 operate on $\partial E/\partial P_2$ (158b) and $E$ (163b).

As the result of these operations, integers are accumulated in the counters 171a and 171b which are proportional to the gain factors $S_1$ and $S_2$, respectively. The operation of the adaptation portion is completed by multiplying the analog quantities $e_1$ and $e_2$ respectively by these integers. A number of mechanizations of this step are possible, of which the following method is preferred where the number of bits of precision is not excessive. A series of gates, 181a and 181b, and summing amplifiers, 182a and 182b, replace the potentiometers of FIG. 10. The inputs to the gates 181a and 181b are the system control path signals $e_1$ and $e_2$, and the counter accumulations, which are a digital representation of the integrals of the weighted errors. The outputs of the gates 181a and 182a are then summed in the amplifiers 182a and 182b respectively, where in each case the signal from each gate is added at a gain corresponding to the ratio of its corresponding bit value to the maximum value of the counter. This embodiment, which is all electronic with no moving parts, is ideally suited for assembly using exclusively "solid state" (transistors, crystal diodes, varistors, etc. to the exclusion of vacuum electron devices) parts and modern high-density packaging. So applied, the system resuits in compact, low-power apparatus with great potential reliability.

While the invention has been explained herein with respect to simplified examples, it will be understood that many changes may be made therein to adapt the invention to complex practical installations, and that the matter hereinbefore set forth or shown in the accompanying drawings is to be interpreted as illustrative only and not in a limiting sense.

The model reference adaptive control system achieves control and improvement of its dynamic response performance through a closed loop process of parameter adjustments to provide optimum performance. Optimum performance is defined to be that which minimizes a selected Performance Index, which is an even integral function of the response error between the reference of performance and the system. Minimization of the Performance Index yields an equation the solution of which provides the required design information.

The selection of performance indices with which to measure the quality of system performance is a topic which has recevied some consideration in the literature but which has by no means been thoroughly investigated. Many performance measures are based on a function of the conventional servo error, the difference between system input and output, and require that some time weighting of the error or other constraint be included in the index to recognize the limitations on response which are imposed by the inertias of the controlled process and by the limitation on practical parts.

The model reference system uses the response error defined as the difference between the outputs of the system and the model to generate the Performance Index by which the performance quality of the model reference system is judged. Use of the model eliminates the necessity for time-variable weighting of the response error as a means of introducing practical limitations into the performance measure. The selected Performance Index is $$\int_{t_1}^{t_2} F(E)\,dt = \text{Performance Index} \qquad (31)$$

in which F(E) is an even function of the response error, E. The interval, $t_1$ to $t_2$, over which the integral is evaluated, is of sufficient length to include an appreciable portion of the dynamic response of the system to an input initiated at time $t_1$. A fairly simple function that is used as illustration herein is $F(E)=E^2$.

Having thus described the invention, what is desired to be claimed and secured by Letters Patent is:

1. A model reference adaptive control system of the type wherein adaptation is effected by the variation of the gain of a plurality of adjustable sensitivity elements of said system to minimize an integral-squared response error of said system measured relative to the corresponding response of a model comprising (a) a model filter which is an analog of the system specification, a first sub-model filter having a performance function equal to the product of the performance function of said system model cascaded with the inverse characteristics of appropriate ones of system forward path elements, whereby said sub-model filter performance function approximates the performance function of said system measured from the output of a corresponding one of said adjustable elements to the output of said system, (b) means for applying to said sub-model the control system signal appearing at the input of a first of said adjustable elements, (d) means for connecting the input of said model with the input of said system (e) a summing amplifier connected to the output of said system and the output of said model to respond to the error between said outputs, and provide a response error signal (f) an inverting amplifier to generate the negative of said error signal (g) a rate servo for adjusting said first adjustable element, and (h) switching means connecting said servo alternatively to error signal or said negative responsive to the polarity of the output of said first model filter.

2. A model reference adaptive control system of the type wherein adaptation is effected by the variation of the gain of an adjustable sensitivity element of said system to minimize an even integral function of the error of the response of said system measured relative to the corresponding response of a model, comprising (a) a sub-model having a performance function equal to the product of the performance function of said system model cascaded with a performance function which is the inverse of appropriate ones of system forward path elements, whereby sub-model performance function approximates the performance function of said system measured from the output of said adjustable element to the output of said system, (b) means for applying to said sub-model the control system signal appearing at the input to said adjustable element, (c) means for transforming said error into a weighted error signal by switching operations, said transformation being identity for one polarity of sub-model output and a reversal of polarity for the other polarity of said sub-model output, and (d) means for adjusting said element responsive to said weighted error signal.

3. A model reference adaptive control system of the type wherein adaptation is effected by the variation of the gain of a plurality of adjustable sensitivity elements of said system to minimize an integral-squared response error of said system measured relative to the corresponding response of a model, comprising (a) an equal plurality of sub-models wherein each said sub-model has a performance function equivalent to the product of the performance function of said system model cascaded with the inverse characteristics of appropriate ones of system forward path elements, whereby each said sub-model performance function approximates the performance function of said system measured from the output of a corresponding one of said adjustable elements to the output of said system, (b) means for applying to each of said sub-models the control system signal appearing at the input to said corresponding adjustable element, (c) means for operating on the output of each of said models with an equal plurality of logical operators each of which transforms said corresponding output identically if, and only if, the response error is positive and which transforms said corresponding output into its negative when said response error is not positive, and (d) means for controlling said plurality of adjustable elements responsive to the outputs of said corresponding plurality of logical operators.

4. A model reference adaptive control system of the type wherein adaptation is effected by the variation of the gain of a plurality of adjustable sensitivity elements of said system to minimize a response error of said system measured relative to the corresponding response of a model comprising, (a) an equal plurality of sub-models each of which has a performance function approximating the performance function of said system measured from the output of a corresponding one of said elements to the output of said system, (b) means for connecting each of said sub-models to the control system signal appearing at the input to said corresponding element, (c) means responsive to said response error and to the output signal of one of said sub-models, for adjusting the sensitivity of a corresponding one of said elements, the direction of adjustment being in accord with the sign of the product of said response error multiplied by the output signal of the corresponding sub-model.

5. A model reference adaptive control system as set forth in claim 4 in further combination with means to command the rate of said adjustment to be proportional to said error.

6. A model reference adaptive control system of the type wherein adaptation is effected by the variation of the gain of an adjustable sensitivity element of said system to minimize an even integral function of the error of the response of said system measured relative to the corresponding response of a model, comprising (a) a sub-model having a performance function equal to the product of the performance function of said system model cascaded with a performance function which is the inverse of appropriate ones of system forward path elements, whereby said sub-model performance function approximates the performance function of said system measured from the output of said adjustable element to the output of said system, (b) means responsive to said response error and to the output signal of said sub-model, for adjusting the sensitivity of said adjustable element, the direction of adjustment being in accord with the sign of the product of said response error and the output signal of said sub-model.

7. A model reference adaptive control system as set forth in claim 6 in further combination with means to command the rate of said adjustment to be proportional to said error.

References Cited by the Examiner

UNITED STATES PATENTS

| | | | |
|---|---|---|---|
| 2,880,384 | 3/1959 | Surtees | 318—489 X |
| 3,008,077 | 11/1961 | Osder et al. | 318—489 X |
| 3,030,054 | 4/1962 | Lee et al. | 244—77 |
| 3,057,584 | 10/1962 | Bretoi | 318—489 X |

JOHN F. COUCH, *Primary Examiner.*